US006229838B1

(12) United States Patent
Flichy et al.

(10) Patent No.: US 6,229,838 B1
(45) Date of Patent: May 8, 2001

(54) ELECTRIC ARC FURNACE FOR THE PRODUCTION OF STEEL AND METHOD OF OPERATING THIS FURNACE

(75) Inventors: Sébastien Flichy; Jacky Laurent; Frédéric Viraize; Marc Bremont; Jean-Claude Vuillermoz, all of Paris Cedex (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/560,895

(22) Filed: Apr. 28, 2000

(30) Foreign Application Priority Data

May 7, 1999 (FR) ...................................... 99 05859

(51) Int. Cl.[7] ...................................................... H05B 7/18

(52) U.S. Cl. .................................. 373/60; 266/47; 432/13

(58) Field of Search .................................. 373/60, 71, 72, 373/75, 85; 432/2, 8, 13, 19, 20, 159; 266/265, 268, 47; 75/10.19; 219/121.36, 121.37

(56) References Cited

U.S. PATENT DOCUMENTS

| 5,217,366 | * | 6/1993 | Laurenceau et al. | 432/13 |
| 5,635,130 | * | 6/1997 | Leczo et al. | 266/47 |
| 5,788,921 | * | 8/1998 | Gitman et al. | 266/225 |
| 5,802,097 | * | 9/1998 | Gensini et al. | 373/72 |
| 5,814,125 | * | 9/1998 | Anderson et al. | 75/414 |
| 5,822,357 | * | 10/1998 | Slootman et al. | 373/72 |

FOREIGN PATENT DOCUMENTS

| 0 481 835 A2 | * | 9/1991 | (EP) . |
| 0 723 129 A2 | * | 7/1996 | (EP) . |
| 0 964 065 A1 | * | 12/1999 | (EP) . |

* cited by examiner

*Primary Examiner*—Tu Ba Hoang
(74) *Attorney, Agent, or Firm*—Burns, Doane, Swecker & Mathis, L.L.P.

(57) ABSTRACT

An electric arc furnace is provided for the production of steel by melting metal between electrodes. The electric arc furnace comprises gas injectors provided with respective cooling chambers placed in a wall of the furnace, wherein at least one single chamber is associated with at least two injectors in order to cool each injector. Each injector is angled in a manner appropriate with respect to a corresponding gas injected thereby and to a corresponding function thereof, wherein the orientation axes of the injectors are not parallel.

15 Claims, 5 Drawing Sheets

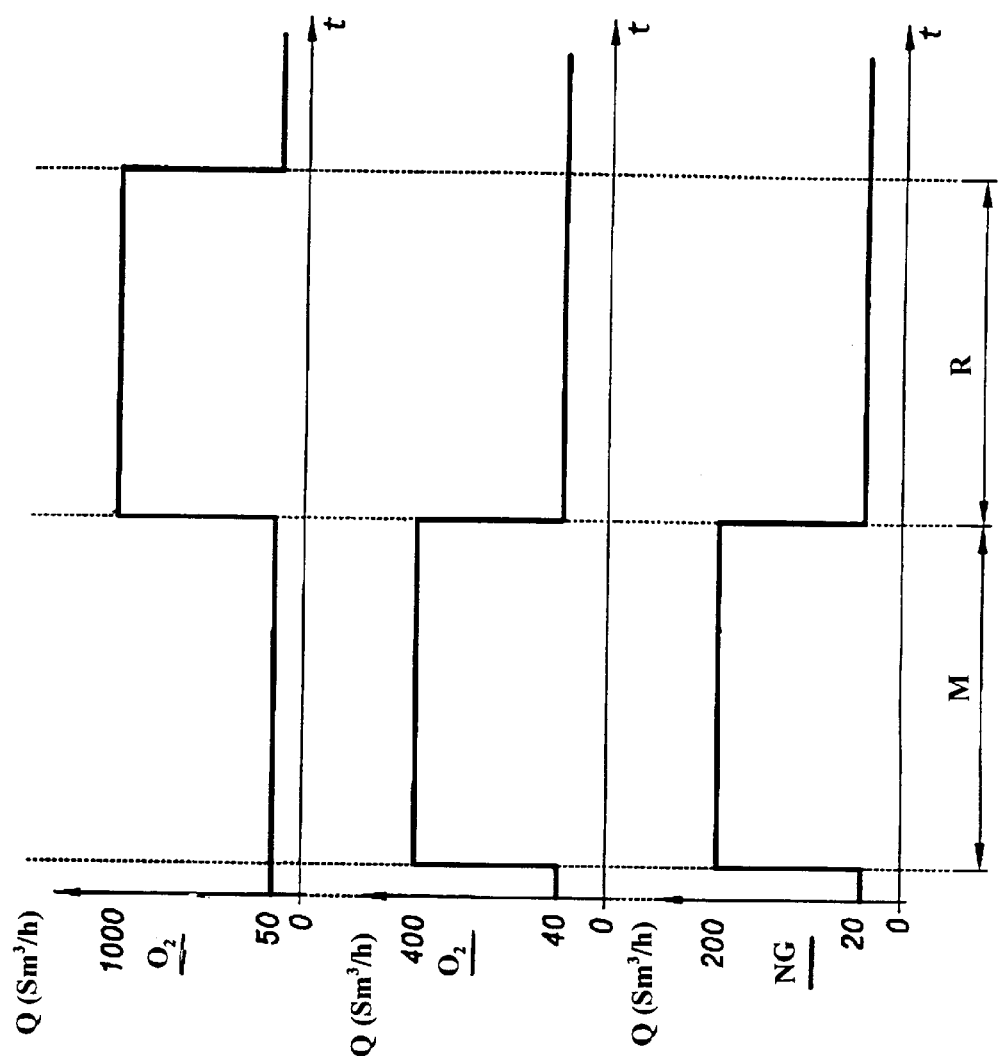

ELECTRIC ARC FURNACE FOR THE PRODUCTION OF STEEL AND METHOD OF OPERATING THIS FURNACE

This application claims priority under 35 U.S.C. §§119 and/or 365 to 99 05859 filed in France on May 7, 1999; the entire content of which is hereby incorporated by reference.

BACKGROUND OF THE INVENTION

1. Field of the Invention

The subject of the present invention is an electric arc furnace for the production of steel, as well as a method for operating this furnace.

2. Description of the Related Art

As is known, steel is obtained in such furnaces by melting scrap between electrodes, these furnaces comprising gas injectors provided with respective cooling chambers placed in a wall of the furnace. These injectors make it possible for oxygen and natural gas to be injected simultaneously so as to increase the energy supplied to the metal.

The use of burners and of injectors consisting of lances with oxygen injected at supersonic speed is well known. In the technology of manufacturing steel in an electric arc furnace, scrap is melted by establishing, in particular, an electric arc between the electrodes of the furnace and the metal so as to supply energy, melt the metal and keep it molten. By using burners and by adding oxygen and carbon, the additional energy that speeds up the metal melting process can be delivered to the metal.

The fitting of oxygen and carbon injectors and of burners in the wall of the furnace cannot be accomplished without taking into account a number of parameters, namely the position of the injector or of the burner on the panel, the available space outside the furnace at the chosen place for fitting them, etc. Each wall injector or each burner is protected by a cooling chamber consisting of a water-cooled cooling box usually made of copper, which is inserted into the panel.

A burner makes it possible to melt the scrap more rapidly and to eliminate any cold spots in the furnace, while an oxygen lance makes it possible to inject oxygen into the slag in order to obtain a foaming slag and to inject oxygen into the pool in order to decarburize it. The angle of propagation of the burner flame in the vertical plane with respect to the horizontal plane must lie within a defined angular range, the flame not being able to be angled radially in the furnace. On the other hand, the angle of oxygen injection with respect to the surface of the pool must be relatively large so that the oxygen can penetrate the pool or the slag without bouncing back off the surface of either of them. In practice, the angles of oxygen injection in the vertical plane must be greater than 40 degrees with respect to the horizontal plane.

In order to reduce the volume requirement and the problems caused by the multiplicity of holes in the panels of the furnace, devices have been created for fulfilling several functions with the same gas outlets. Thus, burners are known which can be switched to "oxygen lance" mode or oxygen lances are known which can operate in "burner" mode using the same gas outlets.

These devices therefore propagate their flame and inject their oxygen in the same direction. They do not allow the angle of oxygen injection and that of propagation of the flame to be modified.

SUMMARY OF THE INVENTION

The object of the present invention is to provide a solution allowing this drawback to be eliminated, by reducing the volume requirement of the gas injectors around a furnace while maintaining their specificity and by simplifying the fluid feeds around the furnace.

The electric arc furnace for the production of steel forming the subject of the invention is of the type comprising gas injectors provided with respective cooling chambers placed in a wall of the furnace.

According to the invention, at least one single chamber is associated with at least two injectors in order to cool them.

According to one embodiment of the invention, at least one of the injectors is a supersonic gas injector, such as an oxygen lance, and at least one other injector is a burner that can use at least one oxygen-containing gas and a fuel.

The cooling chamber is, for example, a "cooling box" using water as the coolant. The invention therefore makes it possible to place a burner and a supersonic oxygen lance in the same cooling box (generally made of copper) both the burner and the lance being angled in the vertical and horizontal planes at angles appropriate to their respective functions, the function of the burner being to heat the pool of metal and/or to ensure postcombustion above the pool in order to oxidize the CO (and $H_2$) possibly formed, whereas the lance, which is preferably a supersonic oxygen injection lance, directed towards the pool of metal allows decarburization of the molten iron, with or without the addition of pulverized coal.

In principal, this arrangement does not mean that the dimensions of the cooling box have to be increased with respect to a cooling box associated with a burner or with an oxygen injector according to the prior art.

According to another characteristic of the invention:
in the vertical plane, the longitudinal axis of the burner, which corresponds to the angle of propagation of its flame, defines with a horizontal plane an angle of between 20 and 30 degrees approximately; in the horizontal plane, the angle between the longitudinal axis of the burner and a vertical plane perpendicular to the wall of the cooling chamber is between zero degrees and 30 degrees approximately.

For further details about the type of tools according to the invention and the way in which they are used, reference may be made, for example to the texts U.S. Pat. Nos. 4,622,007, 4,642,047, 5,714,113, 5,788,921 or 5,843,368.

Further features and advantages of the invention will appear in the course of the following description, given with reference to the appended drawings which illustrate by way of non-limiting examples several embodiments thereof.

BRIEF DESCRIPTION OF FIGURES OF THE DRAWING

FIG. 8 is a diagram illustrating a non-limiting example of the flowrates of various gases in a pair of injectors placed through the wall of an electric furnace in accordance with the invention, during the successive phases of melting and refining the pool of steel.

DETAILED DESCRIPTION OF THE PREFERRED EMBODIMENTS

Figure 1:
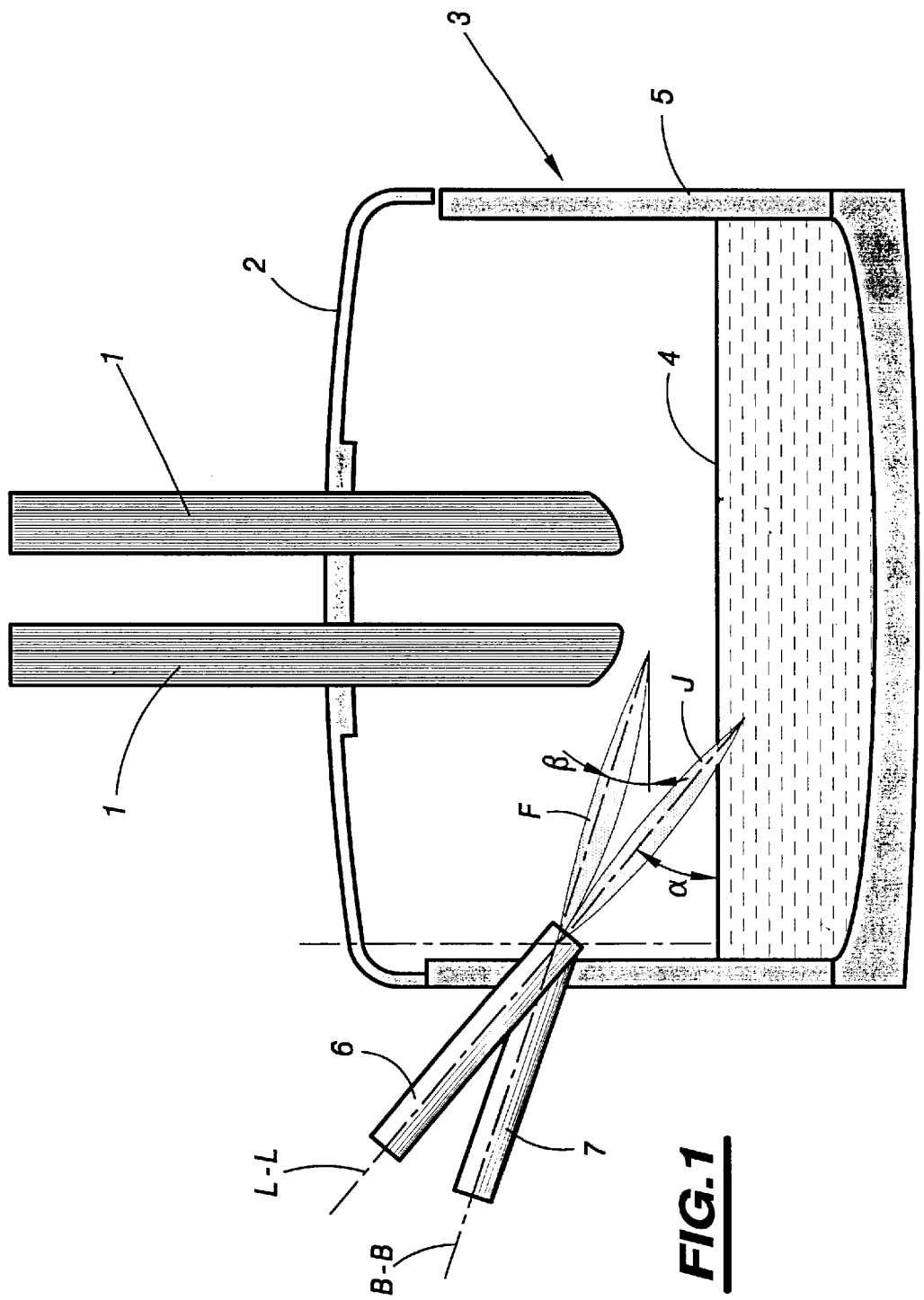
FIG. 1 is a simplified side elevation of an electric arc furnace for the production of steel, provided with injectors placed in accordance with the invention according to a first possible embodiment.

The electric arc furnace shown in FIGS. 1 to 7 is intended for the production of steel by melting scrap between electrodes 1 placed vertically through the roof 2 of a furnace 3 containing a pool of liquid metal 4.

The furnace 3 has a vertical wall 5 through which passes a series of gas injectors, only two, 6, 7 of which are shown. The injector 6 is, for example, a lance for injecting oxygen at supersonic speed and the injector 7 is a burner using at least one oxygen-containing gas and a fuel such as natural gas.

Figure 4:
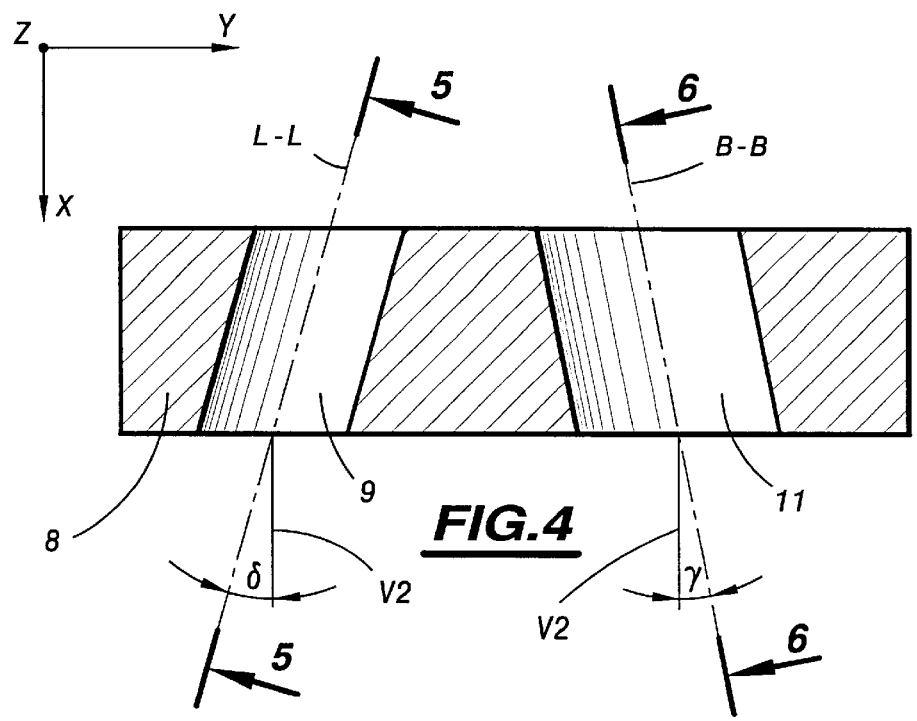
FIG. 4 is a partial sectional view on 4—4 in the FIG. 3, showing the orientation of the two injection ports of the injectors in a horizontal plane through the cooling chamber.
Figures 5, 6:
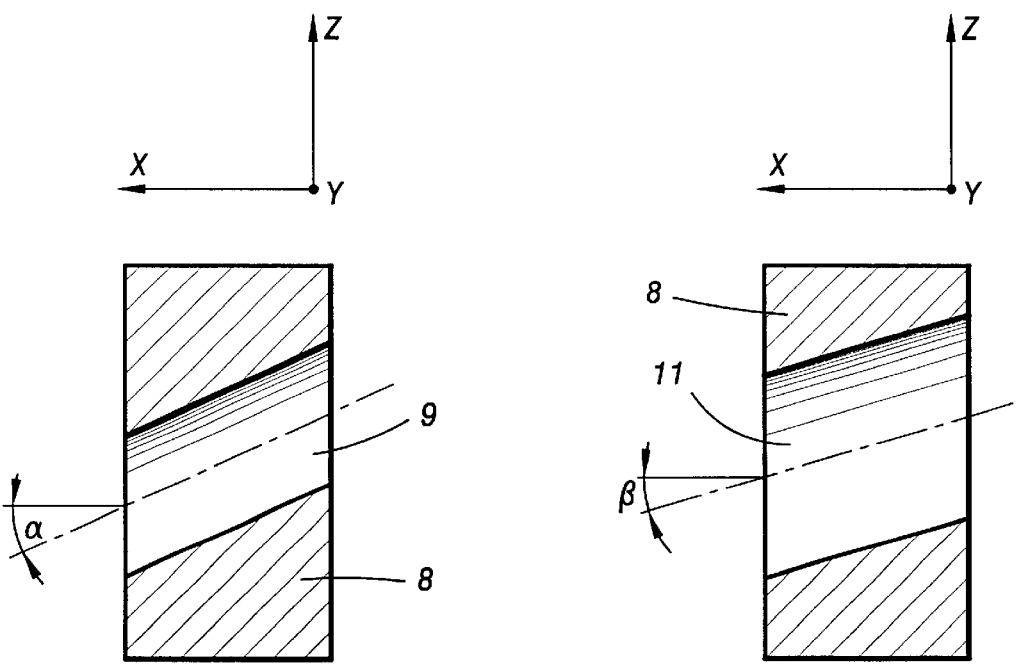
FIG. 5 is a sectional view on 5—5 in FIG. 4 in a vertical plane.
FIG. 6 is a sectional view on 6—6 in FIG. 4 in a vertical plane.

These two injectors 6, 7 pass through a single cooling chamber 8 placed in the wall 5 of the furnace 3. Each injector 6, 7 is angled through this single cooling chamber 8 in a manner appropriate to the corresponding gas and to the corresponding function. The axes L—L and B—B are also the longitudinal axes of the respective oxygen injection ports 9, 11 and of the point of departure of a flame from the burner 6, these being made in the cooling chamber 8 (FIGS. 4 to 6).

Each injector 6, 7 has a respective longitudinal axis L—L and B—B and is placed with a defined inclination of its longitudinal axis in a horizontal plane and in a vertical plane. The oxygen jet J is directed along the longitudinal axis L—L and the flame F of the burner 7 extends along its axis B—B.

Figure 2:
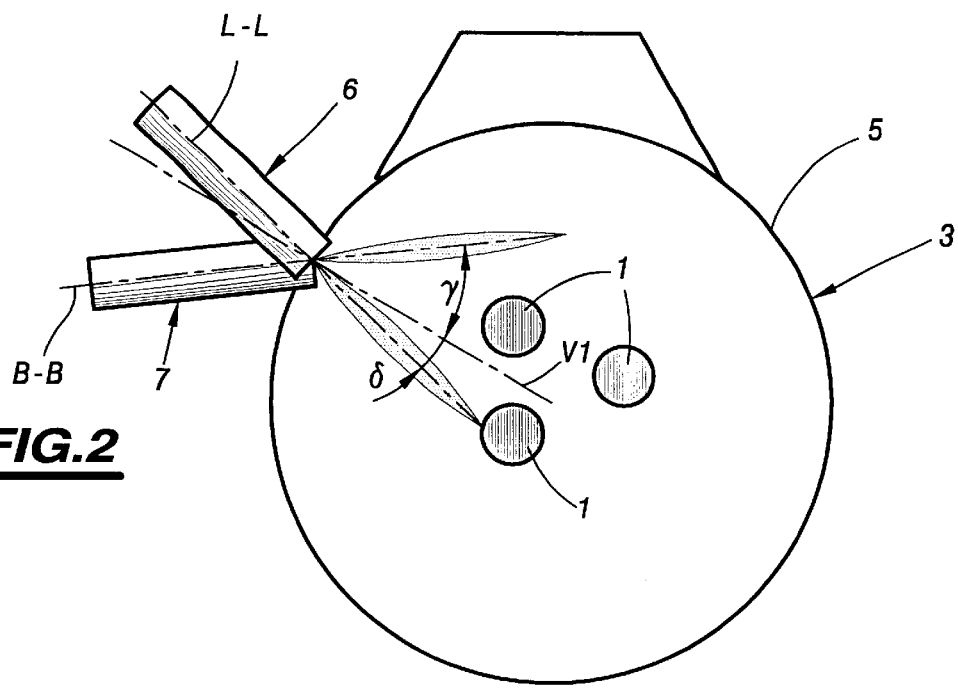
FIG. 2 is a schematic top view of the furnace in FIG. 1, provided with a pair of injectors.
Figure 3:
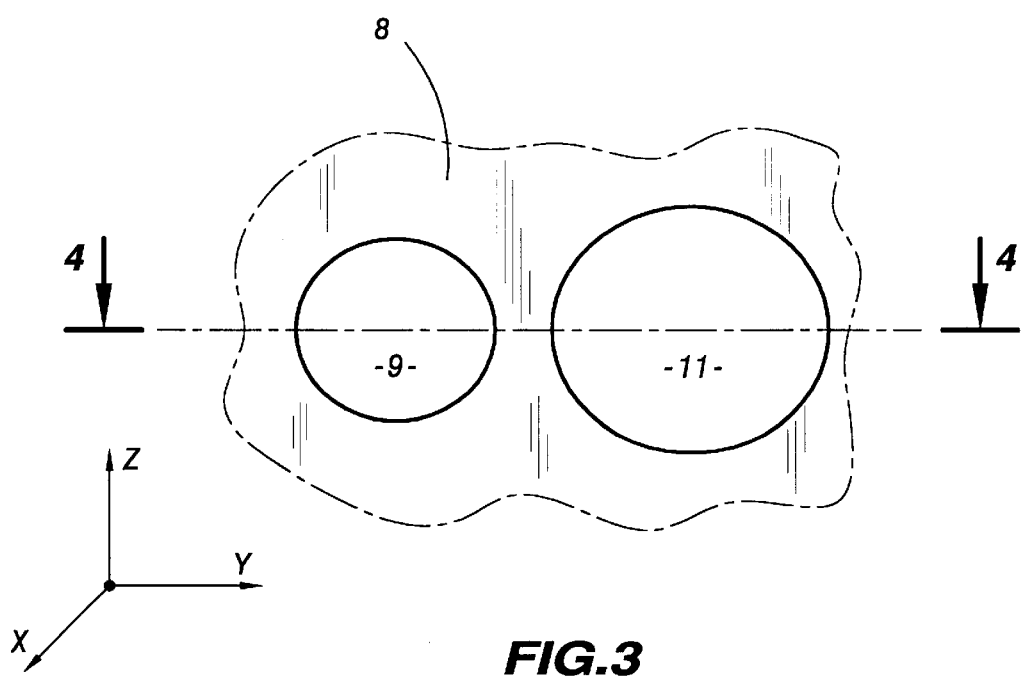
FIG. 3 is a partial elevation of the injection ports of the injectors through the cooling chamber placed in the wall of the furnace according to a second embodiment.

In the vertical plane, the longitudinal axis B—B of the burner 7, to which the axis of the flame F corresponds, defines with a horizontal plane an angle β of between 20 and 30 degrees approximately. In the vertical plane, the axis B—B defines with a radial vertical plane V1 (FIG. 2) of the furnace 3, passing substantially through a central point of an arc joining the centres of the two injectors 6, 7, an angle γ of between zero degrees and 30 degrees approximately. In FIG. 2, the angle γ is approximately 30 degrees while in the example of FIG. 4 this angle γ is only 15 degrees approximately (the angle between a vertical radial plane V2 and the axis B—B of the burner 6).

In the vertical plane, the angle α between the longitudinal axis L—L of the supersonic gas injector 6 and a horizontal plane is (FIG. 5) between 35 and 60 degrees approximately; in the horizontal plane, the angle δ, between the said longitudinal axis L—L and a radial vertical plane V2 intersecting the axis L—L, is between zero degrees and 30 degrees approximately. In the example in FIG. 4, the angle δ is thus 15 degrees approximately.

FIGS. 3, 4, 5 and 6 show the axes in the three dimensions: X for the horizontal direction, Y for the transverse horizontal direction and Z for the vertical direction.

Figure 7:
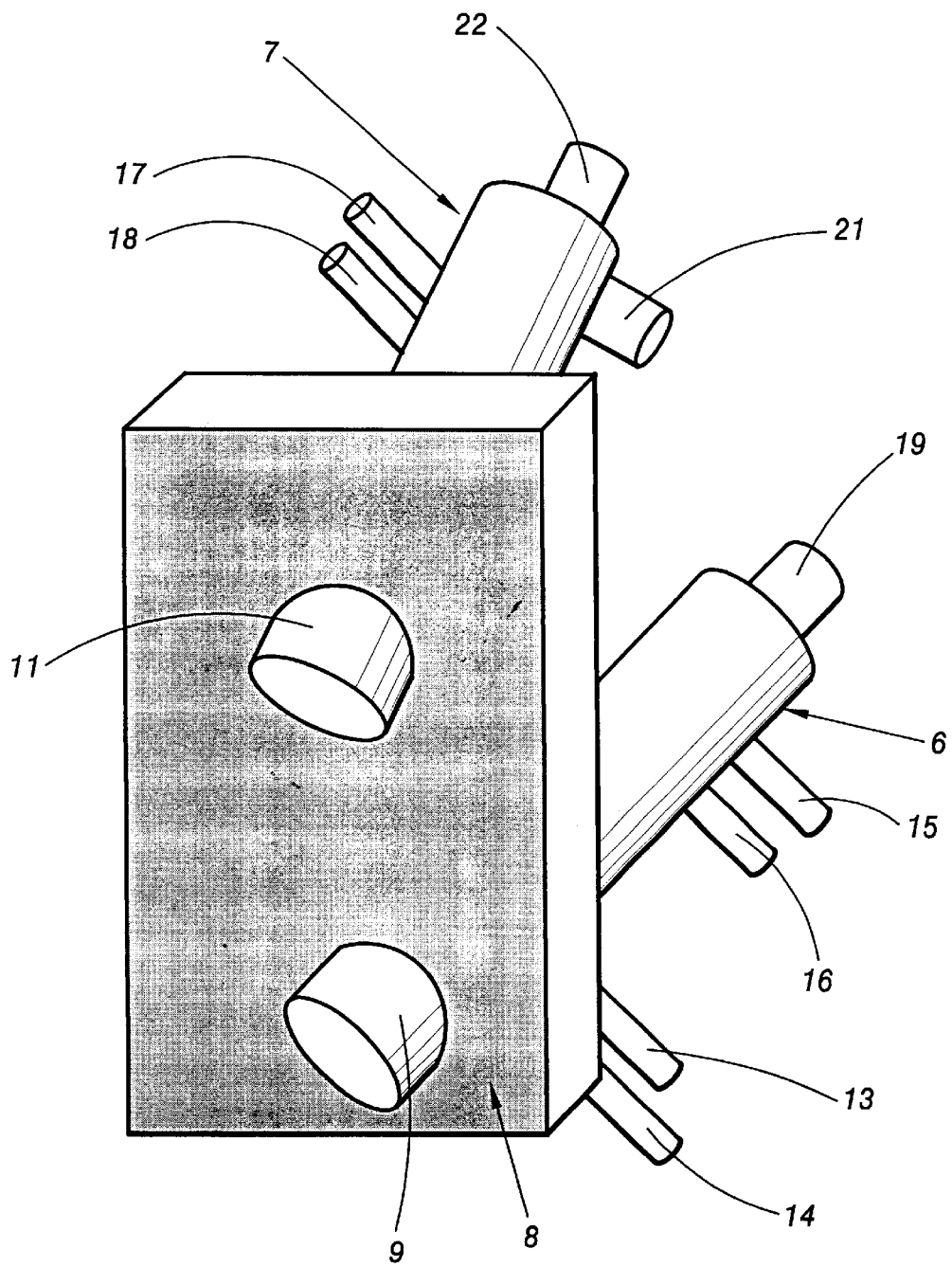
FIG. 7 is a perspective view of a third embodiment of the pair of gas injectors in FIGS. 1 and 2 as well as of their cooling chamber.

Moreover, in FIG. 7 which shows a third embodiment of the invention, the cooling box 8 is provided in a known manner with an inlet 13 and with an outlet 14 for the water of the cooling circuit; likewise, the injectors 6, 7 are provided with an inlet 15 and an outlet 16 and with an inlet 17 and an outlet 18 for the water of their own cooling circuit, respectively. The oxygen is introduced via a nozzle into the injector 6 and into the burner 7 via a nozzle 21; the natural gas is injected into it via an inlet 22.

The injector 6, 7 here are practically superposed in a vertical plane, whereas in the previous embodiments they are offset in a horizontal plane.

In accordance with the method of operating the furnace according to the invention, the supersonic gas jet from the oxygen lance 6 advantageously has a flowrate of between 50 and 2500 $Sm^3/h$ and its injection speed is between 10 and 1000 m/s approximately. As regards the burner 7, this operates with an oxygen-containing gas, comprising at least 25% oxygen, and a combustible gas, and delivers a maximum power of between 0.5 and 5 MW.

The diagram in FIG. 8 illustrates an indicative example of the values of the flowrates Q in $Sm^3/h$, as a function of the time during a cycle for manufacturing steel in the furnace 3 (melting M then refining R), of the oxygen $O_2$ in the lance 6, of the oxygen $O_2$ in the burner B and of the natural gas NG in the burner 7.

The electric furnace 3 may be provided with several cooling chambers 8, for example water-cooled copper cooling boxes, at least one of these cooling boxes being provided with at least two gas injectors, such as 6 and 7.

The invention therefore makes it possible to combine in the same cooling box 8, without in principle increasing its dimensions, at least two injectors, which represents an appreciable reduction in the volume requirement with respect to the arrangements in prior furnaces. The flame F and the oxygen jet J are not necessarily injected radially but slightly tangentially, the two angles δ and γ in the horizontal plane not necessarily being equal.

By way of non-limiting example, the aforementioned angles may have the following values: α=45 degrees, β=20 degrees, δ=0 and γ=0.

Outside the melting period M and refining period R, the burner 7 and the injector 6 have gas flowrates corresponding to the pilot flowrates. Once the scrap has been loaded, the burner 7 operates at full capacity, clearing away the scrap loaded into the furnace 3 in the regions immediately around the burner. The lance 6 is in pilot flow mode. As soon as these surrounding regions have been cleared, the oxygen lance 6 can be used in supersonic mode, the burner 7 remaining in operation until the end of the melting period. During the refining period R, only the lance 6 operates at normal capacity, the burner 7 remaining in pilot flow mode. Once the heat has been completed, the injector 6 and the burner 7 return to pilot flow mode.

What is claimed is:

1. Electric arc furnace for the production of steel by melting metal between electrodes, comprising gas injectors provided with respective cooling chambers placed in a wall of the furnace, wherein at least one single chamber is associated with at least two injectors in order to cool each injector and in that each injector is angled in a manner appropriate with respect to a corresponding gas injected thereby and to a corresponding function thereof, wherein the orientation axes of the injectors are not parallel.

2. Furnace according to claim 1, wherein at least one of the injectors is a supersonic gas injector, and at least one other injector is a burner that uses at least one oxygen-containing gas and a fuel.

3. Furnace according to claim 1, in which each injector has a longitudinal axis, wherein each injector is placed with a defined inclination of its longitudinal axis in a horizontal plane and in a vertical plane.

4. Furnace according to claim 2, wherein in a vertical plane, the longitudinal axis of the burner, which corresponds to the angle of propagation of its flame, defines with a horizontal plane an angle of between about 20 and 30 degrees and, in the horizontal plane, the angle between the longitudinal axis of the burner and a vertical radial plane is between about zero degrees and 30 degrees.

5. Furnace according to claim 2, wherein in a vertical plane, the angle between the longitudinal axis of the supersonic gas injector and a horizontal plane is between about 35 and 60 degrees, and in the horizontal plane, the angle between the longitudinal axis and a vertical radial plane is between about zero degrees and 30 degrees.

6. Method for operating the electric arc furnace according to claim 2, wherein the supersonic gas jet has a flowrate of between 50 and 2500 $Sm^3/h$ and its injection velocity is between 10 and 1000 m/s.

7. Method according to claim 6, wherein the burner operates with at least one oxygen-containing gas, comprising at least 25% oxygen, and a combustible gas and in that it delivers a maximum power of between 0.5 and 5 MW.

8. Furnace according to claim 2, in which each injector has a longitudinal axis, wherein each injector is placed with a defined inclination of its longitudinal axis in a horizontal plane and in a vertical plane.

9. Furnace according to claim 3, wherein in the vertical plane, the longitudinal axis of at least one of the injectors defines with the horizontal plane an angle of between about 20 and 30 degrees and, in the horizontal plane, the angle between the longitudinal axis of the injector and a vertical radial plane is between about zero degrees and 30 degrees.

10. Furnace according to claim 3, wherein in the vertical plane, the angle between the longitudinal axis of at least one of the injectors and a horizontal plane is between about 35 and 60 degrees, and in the horizontal plane, the angle between the longitudinal axis and a vertical radial plane is between about zero degrees and 30 degrees.

11. Furnace according to claim 4, wherein in the vertical plane, the angle between the longitudinal axis of the supersonic gas injector and a horizontal plane is between about 35 and 60 degrees, and in the horizontal plane, the angle between the longitudinal axis and a vertical radial plane is between about zero degrees and 30 degrees.

12. Method for operating the electric arc furnace according to claim 3, wherein at least one of the injectors is a supersonic gas injector, and wherein the supersonic gas jet has a flowrate of between 50 and 2500 $Sm^3/h$ and its injection velocity is between 10 and 1000 m/s.

13. Method for operating the electric arc furnace according to claim 4, wherein the supersonic gas jet has a flowrate of between 50 and 2500 $Sm^3/h$ and its injection velocity is between 10 and 1000 m/s.

14. Method for operating the electric arc furnace according to claim 5, wherein the supersonic gas jet has a flowrate of between 50 and 2500 $Sm^3/h$ and its injection velocity is between 10 and 1000 m/s.

15. Furnace according to claim 2, wherein the supersonic gas injector is an oxygen lance.

* * * * *